(12) United States Patent
Tremblay et al.

(10) Patent No.: US 8,023,518 B2
(45) Date of Patent: Sep. 20, 2011

(54) EFFICIENT PATH SETUP IN A PROVIDER BACKBONE BRIDGE NETWORK

(75) Inventors: Benoit Tremblay, Laval (CA); Martin Julien, Laval (CA); Abdallah Chatila, Montreal (CA); Richard Tremblay, Rosemere (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 532 days.

(21) Appl. No.: 12/114,401

(22) Filed: May 2, 2008

(65) Prior Publication Data
US 2009/0274148 A1 Nov. 5, 2009

(51) Int. Cl.
*H04L 12/56* (2006.01)
(52) U.S. Cl. .................... 370/401; 370/428; 709/245
(58) Field of Classification Search .................. 370/389, 370/392, 400, 401, 409, 428, 475; 709/245
See application file for complete search history.

(56) References Cited

U.S. PATENT DOCUMENTS

| 7,693,164 B1* | 4/2010 | Busch et al. ................. 370/401 |
| 2006/0248227 A1* | 11/2006 | Hato et al. .................... 709/245 |
| 2007/0086455 A1 | 4/2007 | Allan et al. |
| 2008/0267198 A1* | 10/2008 | Sajassi ........................ 370/401 |
| 2009/0109848 A1* | 4/2009 | Hato et al. ................... 370/235 |
| 2009/0196298 A1* | 8/2009 | Sajassi et al. ............ 370/395.53 |

FOREIGN PATENT DOCUMENTS

| EP | 2075981 A1 | 7/2009 |
| WO | 2006060184 A2 | 6/2006 |
| WO | 2006060184 A3 | 6/2006 |
| WO | 2009013582 A1 | 1/2009 |

OTHER PUBLICATIONS

Aggarwal, R. et al.: "Advertising a Router's Local Addresses in OSPF TE Extensions"; Nov. 18, 2007. Network Working Group, Internet Draft. Expiration Date: May 21, 2008.
"Generalized Multiprotocol Label Switching (GMPLS)"; published in 2007. Web ProForum Tutorials, http://www.iec.org. Copyright: The International Engineering Consortium.
Trillium: "Multiprotocol Label Switching (MPLS)"; published in 2007. Web ProForum Tutorials, http://www.iec.org. Copyright: The International Engineering Consortium.

(Continued)

*Primary Examiner* — Hassan Phillips
*Assistant Examiner* — Duc Duong
(74) *Attorney, Agent, or Firm* — Alex Nicolaescu; Ericsson Canada Inc.

(57) ABSTRACT

In a provider backbone—traffic engineering network, a method and a bridge node are provided for setting up path between edge bridges connected to customer premises. A first edge bridge advertises towards peer edge bridges a tuple comprising a port identity and a layer two address. When it needs to set up a path towards the first edge bridge, one of the peer edge bridges uses information in the tuple to compute a path label.

32 Claims, 6 Drawing Sheets

OTHER PUBLICATIONS

A. Takacs et al.: "GMPLS Controlled Ethernet: An Emerging Packet-Oriented Transport Technology"; IEEE Communications Magazine, Sep. 2008, pp. 118-124.

Interworking Task Group, IEEE 802.1Qay/D2.0, Draft Standard for Local and Metropolitan Area Networks, "Virtual Bridged Local Area Networks—Amendment: Provider Backbone Bridge Traffic Engineering", XP-002524603, Feb. 15, 2008, pp. 1-114.

Interworking Task Group, IEEE 802.1ah/D4.2, Draft Standard for Local and Metropolitan Area Networks, "Virtual Bridged Local Area Networks—Amendment 6: Provider Backbone Bridges", XP-002539561, Mar. 26, 2008, pp. 1-116.

International Search Report from corresponding PCT Application No. PCT/IB2009/051678.

* cited by examiner

EFFICIENT PATH SETUP IN A PROVIDER BACKBONE BRIDGE NETWORK

TECHNICAL FIELD

The present invention relates generally to the field of communications and, more specifically, to a method and a node for setting up a path in a provider backbone bridge network.

BACKGROUND

Today's wide area networks (WAN) make extensive use of multiprotocol label switching (MPLS) networks to provide Internet services at very high rates over very broad areas. MPLS-based IP networks can efficiently route traffic and provide quality of service (QoS) control.

FIG. 1 is a prior art representation of a simplified multi-protocol label switching network. The MPLS network 100 connects a first host 110, which is a data source, and to a second host 160, which is a data destination. The first host 110 connects into the MPLS network though a first router, called label edge router (LER) 120. The second host 160 connects to a second router, called LER 170. Between the two LERs 120 and 170 are located several label switch routers (LSR) 132, 134, 136 and 138. Only the LERs 120 and 170 are used to connect the MPLS network to external hosts. Connections may exist between any label edge and LSRs, though in general, connections between routers within the MPLS network 100 are installed in accordance with good practices based on geographical location of each router, need for providing sufficient capacity and reliability between the routers, etc.

When the first host 110 intends to send a packet towards the second host 160, it includes in that packet an IP header comprising a source IP address of the first host 110 and a destination address of the second host 160. The packet including the IP header is forwarded to the LER 120. The LER 120 forwards the packet towards one of the LSRs based on traditional IP forwarding methods. In addition, the LER 120 adds a label request in the packet. For example, the LER 120 sends the packet to the LSR 132. In response to the label request, the LSR 132 allocates a label for use between the LER 120 and the LSR 132, and stores that label in an internal table for later use. The LSR 132 forwards the packet, for example towards the LSR 134, the packet still including the label request. The LSR 134 in turn allocates another label for use between the LSR 132 and the LSR 134. The process is repeated at each router until the packet reaches the LER 170 on a unidirectional, forward path. At that time, labels have been allocated for each link between two routers and each allocating router has stored label values internal tables. The LER 170 removes the label request and forwards the packet to its destination, that is, towards the host 160. At the same time, the LER 170 informs one of the LSRs, that is, the LSR which was immediately before the LER 170 on the forward path, of the label the LER 170 has allocated to a link between it and that LSR. That LSR takes note of the label value allocated by the LER 170, and forwards the packet towards a next router, informing that next router of the label value it has itself allocated. The process continues towards the LER 120. As such, as this label information towards the LER 120, each router along the forward path is informed of labels used between itself and the next router on the forward path. A collection of labels between routers along a data path is called a Label Switched Path (LSP). As new packets are sent from the first host 110 and the second host 160, the LER 120 that receives those packets directly from the first host 110 adds a relevant label value to the packets, wherein the relevant label value relates to traffic to be exchanged between these two hosts and to the next router on the LSP towards the other host. That next router does not need to look at any destination address included in those packets as it rather forwards the packet based on the label only. As a result, not only all packets exchanged between the two hosts travel through a same LSP, but the routers act more rapidly in receiving and forwarding the packets based on those labels, not having to route the packets based on IP addresses. It should be noted that an LSP is unidirectional, so an identical process of setting a second LSP is required, in a reverse direction from the LER 170 connected to the second host 160 towards the LER 120, connected to the first host 110.

A tutorial entitled "Multiprotocol Label Switching (MPLS)" is available from the International Engineering Consortium. This tutorial is included herein by reference.

Generalized MPLS (GMPLS) extends MPLS beyond the IP routing domain into other areas such as time division multiplexing, optical networks, and the like. GMPLS uses a suite of protocols, including open shortest path first (OSPF), resource reservation protocol (RSVP) and link management protocol (LMP). OSPF finds the topology of a network and provides information on the property of ports within the network, this information comprising for example data rate capacity of such ports. RSVP, once a path has been computed by use of OSPF, reserves the resources. LMP distributes information e.g. on link failures. One of the improvements added within GMPLS is the possibility for a router to suggest a label value when opening a path, rather than simply requesting a label value from the next router in on the path. The router that receives the label request comprising the suggested label value may optionally accept the suggestion, or decline it and supply another label value. Ideally, the suggested label value is accepted, as this accelerates the process of setting up switching configuration within the routers. The suggested label value may be declined if the router that receives it detects that the value is in conflict with another label already in use.

A tutorial entitled "Generalized Multiprotocol Label Switching (GMPLS)" is available from the International Engineering Consortium. This tutorial is included herein by reference.

One important disadvantage of MPLS is that this technology requires important capital and operational investments. These networks require sophisticated levels of configuration and expensive hardware. As a result, there is a drive towards using Ethernet as a base for providing high quality and high rate services at lower costs. However, Ethernet is not, traditionally, well suited to traffic engineering and QoS control. Provider backbone bridge-traffic engineering (PBB-TE), specified in Institute of Electrical and Electronics Engineers (IEEE) specification number 802.1Qay, is a recent technology based on Ethernet, which aims at providing similar advantages as those offered by MPLS networks, at lower costs. PBB-TE, sometimes also called provider backbone transport (PBT), works at layer two in a manner similar to MPLS at the IP layer.

GMPLS added to PBB-TE enables automation of the PBB-TE configuration. A path computation engine, defined in GMPLS, uses information obtained by use of OSPF, to know the network topology within the PBB-TE network.

FIG. 2 is a prior art representation of a simplified provider backbone bridge-traffic engineering network. To those skilled in the art, a strong parallel is evident between FIGS. 1 and 2. In contrast with the MPLS network of FIG. 1, the PBB-TE network of FIG. 2 comprises bridges, not routers, and switches traffic at layer two.

The PBB-TE network 200 connects a first customer premise 210, which is a data source, and to a second customer premise 260, which is a data destination. The first customer premise 210 connects into the PBB-TE network through a first bridge, called backbone edge bridge (BEB) 220. The second customer premise 260 connects to a second bridge, illustrated as BEB 270. Between the two BEBs 220 and 270 are located several backbone core bridges (BCB) 232, 234, 236 and 238. Only the BEBs 220 and 270 are used to connect the PBB-TE network to customer premises. Connections may exist between any BEBs and BCBs.

FIGS. 3 and 4 are prior art representations of a backbone edge bridge and of a backbone core bridge, respectively. The BEB 300 comprises a customer instance component 310, sometimes called I (for 'Instance') component, and a backbone component 350, sometimes called B (for 'Backbone') component. The BCB 400 only comprises a B component. Both the I and the B components comprise external ports, and a switching relay, each B component also comprises the above mentioned forwarding database (FDB). The I component of the BEB 300 comprises a plurality of customer instance ports (CIP), for connection towards customer premises. The B component of the BEB 300 comprises a plurality of provider backbone ports (PBP) for connection towards other bridges of the PBB-TE network. The B component of the BCB 400 has a single type of ports, the provider network port (PNP). In the BEB 300, the I and B components are linked by connections between provider instance ports (PIP) of the I component and customer backbone ports (CBP) of the B components.

Returning to FIG. 2, when the first customer premise 210 intends to send a packet towards the second customer premise 260, it first sends the packet to the nearest, or first, BEB 220. Configuration information in the first BEB 220 indicates that the second customer premise 260 is served by the second BEB 270. Part of the configuration information present at the first BEB 220 comprises a layer two address of an input/output (I/O) port of the second BEB 270 for serving the second customer premise 260. The first BEB 220 initiates creation of a tunnel, or switched path, by sending the packet towards the second BEB 270. The packet now comprises, as a destination address, the layer two address of the I/O port of the second BEB 270, a layer two source address designating an I/O port of the first BEB 220, a tag designating the customer site 210 where the packet was originated, and a virtual location area network (VLAN) identifier, in addition to the original packet content. Each BCB along the path receives the packet. On FIG. 2, an exemplary path is shown with links 240a, 240b, 240c, 240d and 240e, noting that links 240a and 240e are not, properly speaking, part of the PBB-TE network. In this example, BCBs 232 and 238 are part of the path. A forwarding database (FDB) in those BCBs 232 and 238 considers the destination address and VLAN identifier to determine an I/O port of the BCB on which the packet shall be forwarded towards its destination. When the OSPF and RSVP processes are executed, the FDBs of each BCB have all stored the layer two destination address and the VLAN identifier. Thereafter, as new packets come in, the BEBs and BCBs forward those packets based on the layer two destination address and on the VLAN identifier stored in FDBs along the path. In essence, the VLAN identifier acts as a label for the path.

It is essential that a combination of the VLAN identifier and layer two address of the second (receiving) BEB 270 is unique within the PBB-TE network, in order for switching based thereon to be functional. It may happen that, in the exemplary PBB-TE network of FIG. 2, the second BEB 270 receives the first packet and discovers that the VLAN identifier cannot be accepted because its value is already in use, for the layer two address of a receiving port. In such a case, negotiation must be made between the two BEBs to select a different VLAN identifier. Evidently, this delays the set-up of the path between the two BEBs.

In US 2007/0086455, Allan et al. attempt to solve this problem. A path request is sent from a bridge on an originating side. The path request arrives at a bridge on a terminating side. The terminating side bridge allocates a VLAN identifier and passes it towards the originating side on an RSVP message. While their method may avoid collision between VLAN identifier values, it may extend the time required to set-up a path, at the beginning of a session. Their method also requires extensive configuration in all BEBs.

SUMMARY

There would be clear advantages of having a rapid and efficient method, and an edge bridge, for setting up a path within a provider backbone bridge-traffic engineering network.

It is therefore a broad object of this invention to provide a method and an edge bridge for advertising a tuple comprising a layer two address and a port identity of the edge bridge, the tuple being used at another edge bridge to compute a label for setting up a path between the edge bridges.

A first aspect of the present invention is directed a method of setting up a path in a provider backbone bridge-traffic engineering network. The method comprises first steps of providing a layer two address to a provider instance port and a port identity to a customer backbone port of an edge bridge. Then, a message is sent to advertise a tuple comprising the layer two address and the port identity. The message is sent towards a plurality of switches of the provider backbone bridge-traffic engineering network.

In a second aspect of the present invention, the method as presented hereinabove is implemented in a network comprising at least one other, second edge bridge receiving the advertisement and storing the layer two address and the port identity in a traffic engineering database. The layer two address and the port identity are used in the second edge bridge for computing a label when establishing a path between the two edge bridges.

A third aspect of the present invention is directed to an edge bridge that comprises a customer instance component and a backbone component. The customer instance component has a plurality of provider instance ports, each of which has a layer two address. The backbone component has a plurality of customer backbone ports, each of which has a port identity and a connection to a provider instance port. The edge bridge comprises a physical port. The edge bridge also comprises a processor adapted to request the physical port to advertise a first tuple comprising the port identity of one of the customer backbone ports and the layer two address of the provider instance port connected to the one of the customer backbone ports.

In a fourth aspect of the present invention, the edge bridge also comprises a memory. The processor can receive from the physical port a second tuple from a peer edge bridge and can store in the memory the second tuple. The processor can then compute a label based on the second tuple, and use the label in establishing a path between the edge bridge and the peer edge bridge.

In a fifth aspect, the invention introduces a method of setting up a path in a provider backbone bridge-traffic engineering network. The method is initiated when a message comprising a layer two address and a port identity of a first edge bridge is received at a second edge bridge. The second edge bridge stores the layer two address and the port identity in a traffic engineering database. The second edge bridge may use the layer two address and the port identity for computing a label when establishing a path.

In a sixth aspect, the invention introduces an edge bridge that comprises a memory, a physical port, a customer instance component having a plurality of provider instance ports, a backbone component having a plurality of customer backbone ports, each of which has a connection to one of the provider instance port, and a processor. The processor can receive, from the physical port, a first tuple comprising a port identity and a layer two address from a peer edge bridge, and store in the memory the first tuple. The customer instance component may comprise a plurality of customer instance ports for connecting the edge bridge towards customer premises. The customer instance ports may receive from one of the customer premises a request to set up a path towards the peer edge bridge, in which case the processor further computes a label based on the first tuple, the label then being used in establishing the path between the edge bridge and the peer edge bridge.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides a method and an edge bridge for rapidly and efficiently allowing the setting up of a path between edge bridges connected to customer premises that are communicating through a provider backbone bridge-traffic engineering (PBB-TE) network, while reducing the amount of configuration needed to operate the network. In order to ensure that an initiating edge bridge, which initiates setting up of a path towards a distant edge bridge, computes a path label that is acceptable to the distant edge bridge, the initiating edge bridge uses a data combination previously received from that distant edge bridge. The combination, or tuple, comprises a layer two address and a port identity from the distant edge bridge. The layer two address corresponds to a provider instance port (PIP) of the second edge bridge, and the port identity corresponds to a customer backbone port (CBP) of the second edge bridge.

For this, the distant edge bridge has earlier advertised the information contained in the tuple by sending, in broadcast or multicast fashion, a message comprising the tuple. The initiating edge bridge has received this message and stored it internally in a traffic engineering database. Upon request to communicate from a customer premise attached thereto, for a packet comprising a destination address pointing towards a distant customer premise attached to the distant edge bridge, the initiating edge bridge calculates a label used in setting up a tunnel between the two edge bridges. The tunnel spans over one or more core bridges, each of which stores the label in a forwarding database (FDB).

In the context of the present invention, an edge bridge may comprise an Ethernet bridge or a layer two switch. The edge bridge may support more features than those illustrated in the following drawings, which are simplified for ease of illustration of the present invention. An edge bridge may have all the capabilities of a core bridge and it may thus act as a core bridge between two other edge bridges.

A network using provider backbone bridge-traffic engineering (PBB-TE) complies with the Institute of Electrical and Electronics Engineers (IEEE) specification number 802.1Qay, and is also sometimes called a provider backbone transport (PBT) network.

Figure 1:
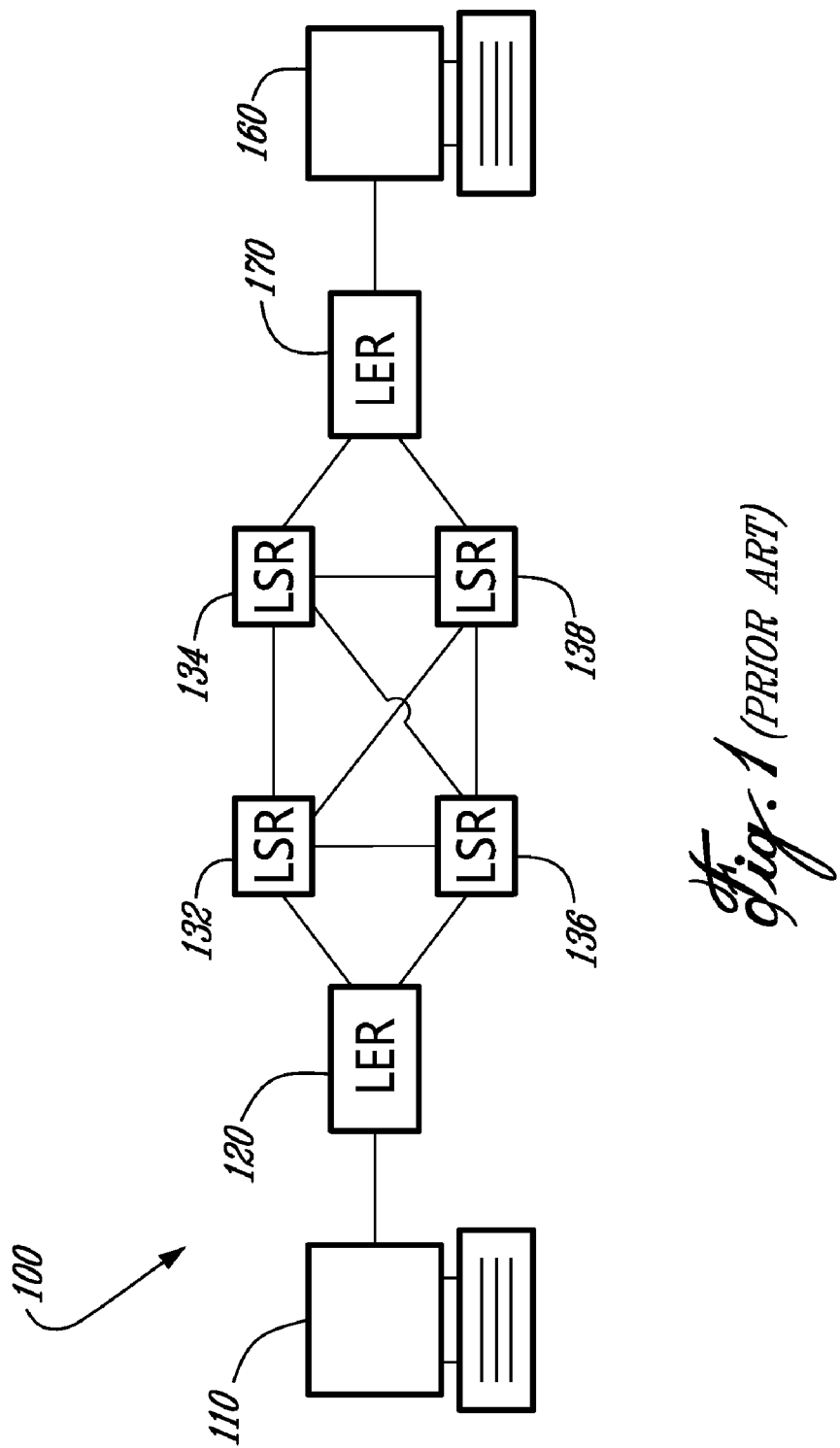
FIG. 1 is a prior art representation of a simplified multi-protocol label switching network.
Figure 2:
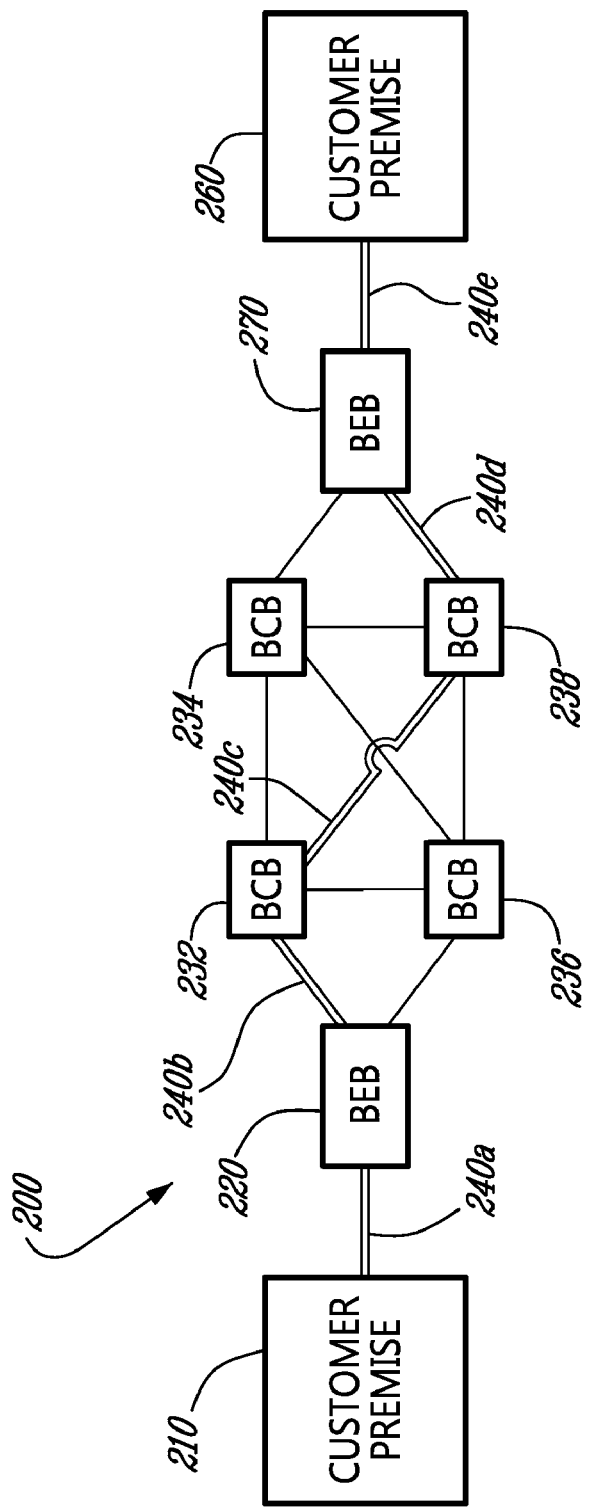
FIG. 2 is a prior art representation of a simplified provider backbone bridge-traffic engineering network.
Figure 3:
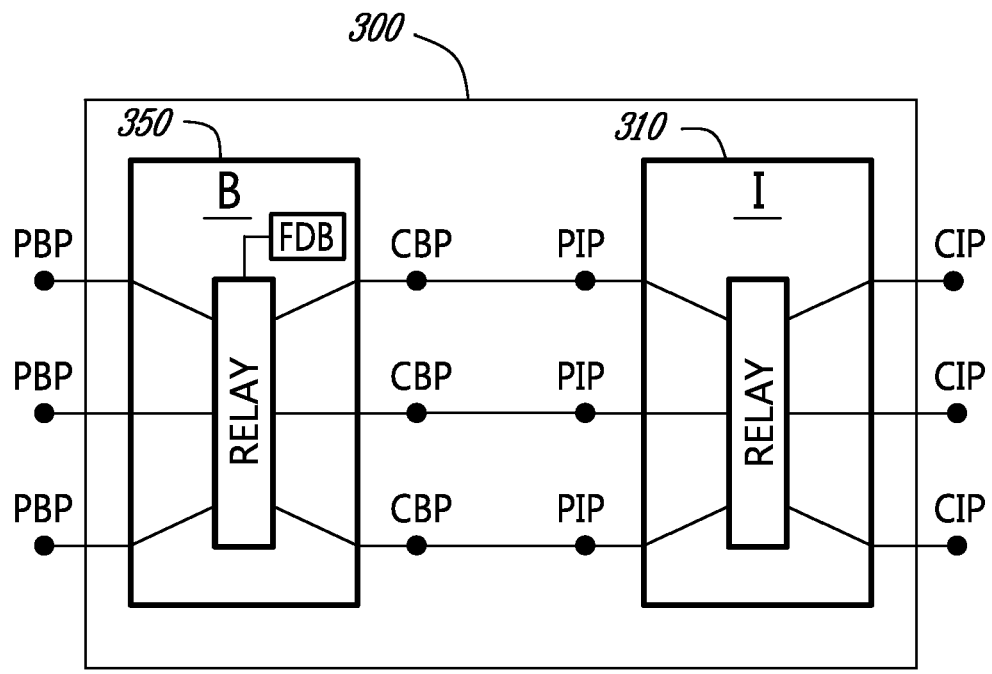
FIG. 3 is a prior art representation of a backbone edge bridge.
Figure 4:
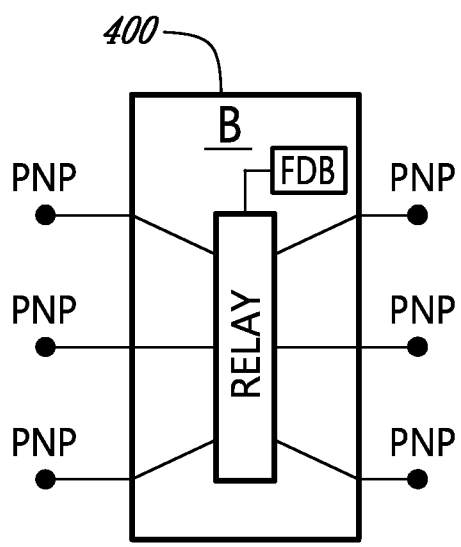
FIG. 4 is a prior art representation of a backbone core bridge.
Figure 5A:
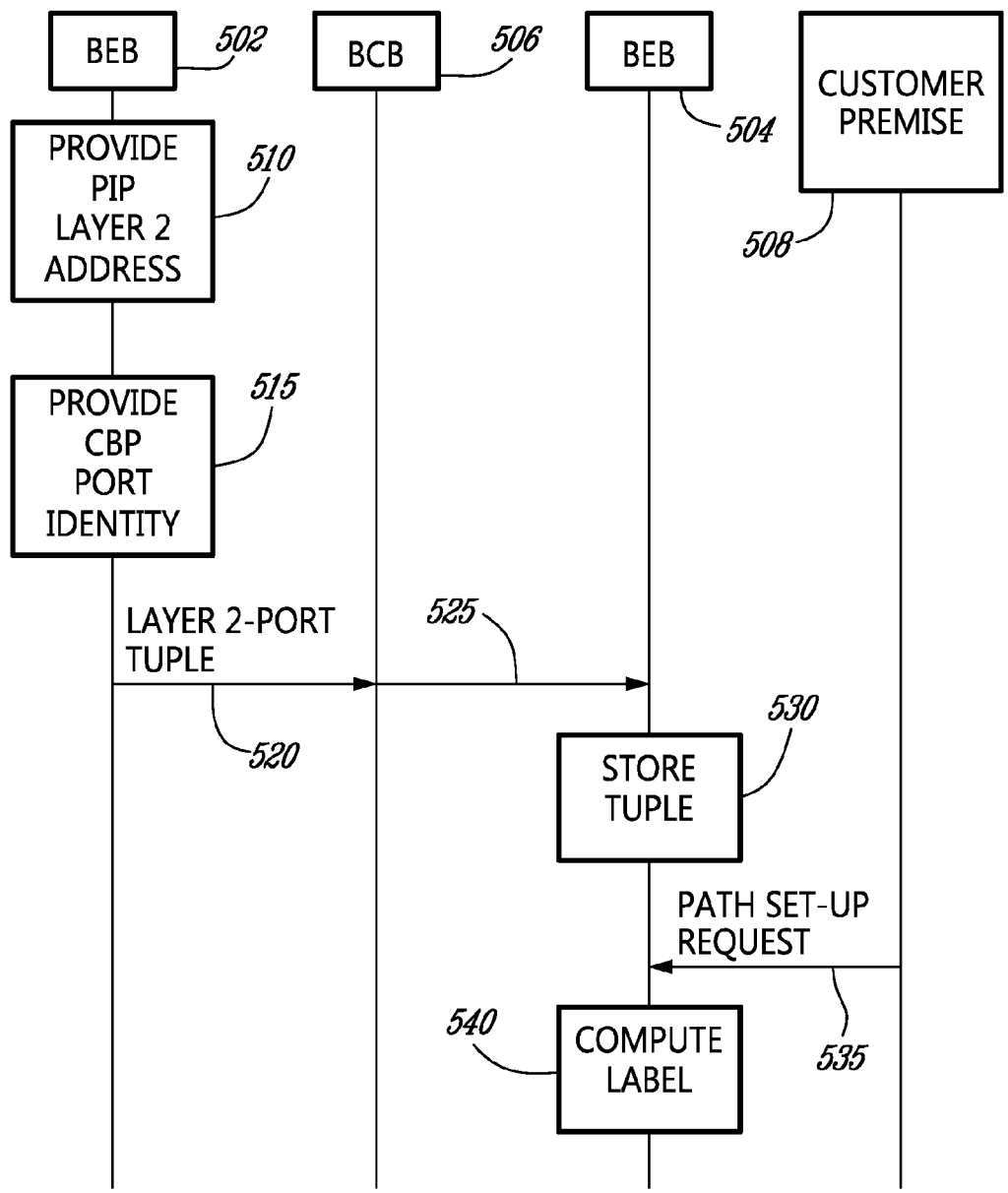
FIGS. 5a and 5b show an exemplary sequence of discovering a topology between edge bridges and establishing a path between the edge bridges, as per some teachings of the present invention.
Figure 5B:
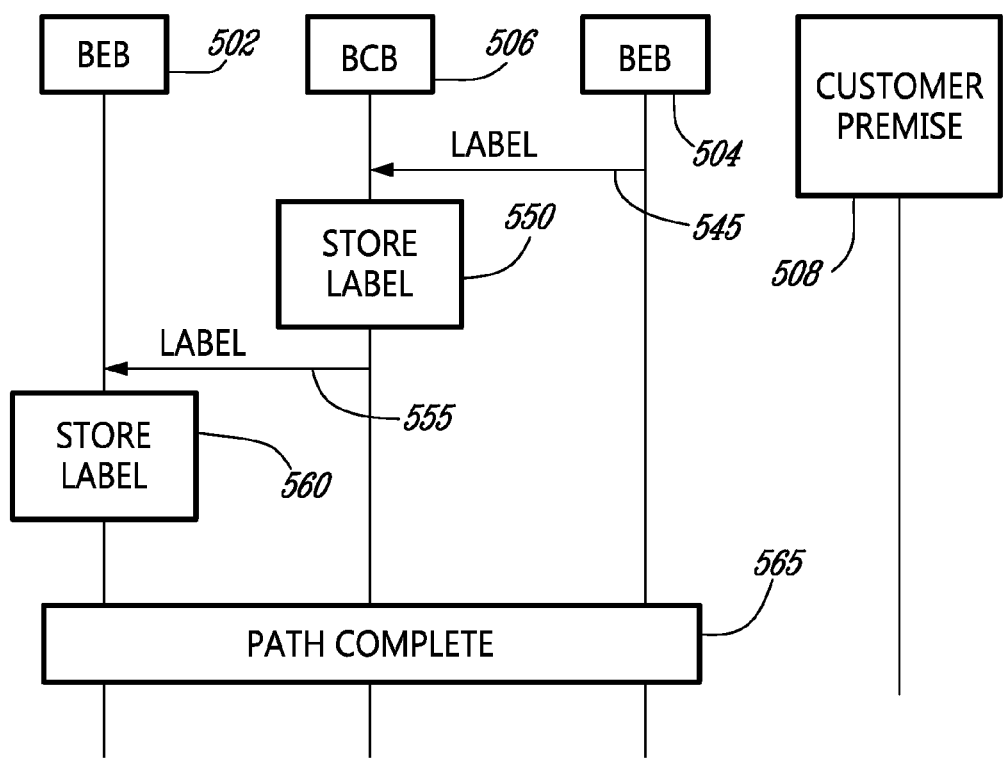

Reference is now made to the Drawings, in which FIGS. 5a and 5b show an exemplary sequence of discovering a topology between edge bridges and establishing a path between the edge bridges, as per some teachings of the present invention. FIGS. 5a and 5b show a sequence of events between a first backbone edge bridge (BEB) 502, a second BEB 504, a backbone core bridge (BCB) 506, and a customer premise 508. In a practical PBB-TE network, there could be a plurality of BCBs between the two BEBs. The sequence starts at step 510 when a layer two address, which may be a media access control (MAC) address, is assigned or otherwise provided to a provider instance port (PIP) of the first BEB 502. A port identity is provided to a customer backbone port (CBP) of the first BEB at step 515. The first BEB 502 then advertises the layer two address and the port identity by sending a message containing these element towards various elements of the provider backbone bridge-traffic engineering (PBB-TE) network; this is shown as step 520, where the tuple is sent from the first BEB 502 towards one or more BCBs 506, and at step 525 where the advertisement message containing the tuple arrives at the second BEB 504. The advertisement may take the form of a broadcast message, a multicast message, or any suitably equivalent method of sending the content of the advertisement towards a plurality of destinations. Preferably, the message may take the form of a type-length-value (TLV), incorporated in an open shortest path first (OSPF) protocol. At step 530, the second BEB 504 stores the tuple in an internal memory.

At step 535, the customer premise 508 sends a path set-up request towards the second BEB 504. A user or a machine within the customer premise 508 intends to initiate a session with another customer premise (not shown), which is connected to the first BEB 502. For this, a forward path from the second BEB 504 to the first BEB 502 needs to be set-up. As such, the path request comprises an identity of the other customer premise. The second BEB 504 matches the identity of the other customer premise with the first BEB 502 based on configuration data. At step 540, the second BEB 502 computes a label, which is a forward path label, for setting up the forward path, or tunnel, at layer two, between itself and the first BEB 502. The label may simply be a concatenation of the layer two address and of the port identity comprised in the tuple. The label may also be a variant based on these two elements of the tuple. At step 545, the second BEB 504 sends the label towards a next BCB 506 on a path towards the first BEB 502. That BCB 506 stores the label in its FDB at step 550. That BCB 506 may then forward the label towards another BCB (not shown), which also stores the label in its own FDB. The process continues until step 555, when one BCB forwards the label to the first BEB 502. The first BEB 502 stores the label in its internal memory at step 560. The first BEB 502 naturally accepts the label value because it is unique, being based on its own internal data. In an infrequent situation where the first BEB 502 could not accept the label value, for example when the label value was previously used in a distinct connection that is in the process of being released, the first BEB 502 would simply reject the label value using prior art RSVP mechanisms. At step 565, the path, or tunnel, is complete between the two BEBs, possibly incorporating one or more BCBs.

The path between the two BEBs will oftentimes be bidirectional. For this, optionally, the second BEB 504 may determine a second label, for use in a reverse path, the second label being based on its own PIP layer two address and on its own BCP port number. The second, reverse path label is in this case sent along with the forward path label sent at step 545. That second label is stored in the BCB 506 at step 550, and transmitted towards the first BEB 502 at step 555. Then at step 560, the first BEB 502 may store the second label for use on the reverse path.

Because labels are based on the port identities of the CBPs and on the layer two addresses designating interface points between the CBPs and the PIPs connected thereto, tunnels or paths actually terminate at, and incorporate, customer backbone ports of the two BEBs. In some embodiments, the CBPs and the PIPs of the two BEBs may be implemented in software, within the BEBs. There may not actually be any hardware port, other than customer instance ports (CIP) and provider backbone ports (PBP). As such, the CBPs and PIPs may be virtual ports, and the layer two address of the PIPs may also be virtual addresses. In such cases, the tunnel between the two BEBs terminates at virtual points within the BEBs: those points are actually implemented within the BEBs, but may consist of software elements without requiring actual hardware implementation of the ports.

Figure 6:
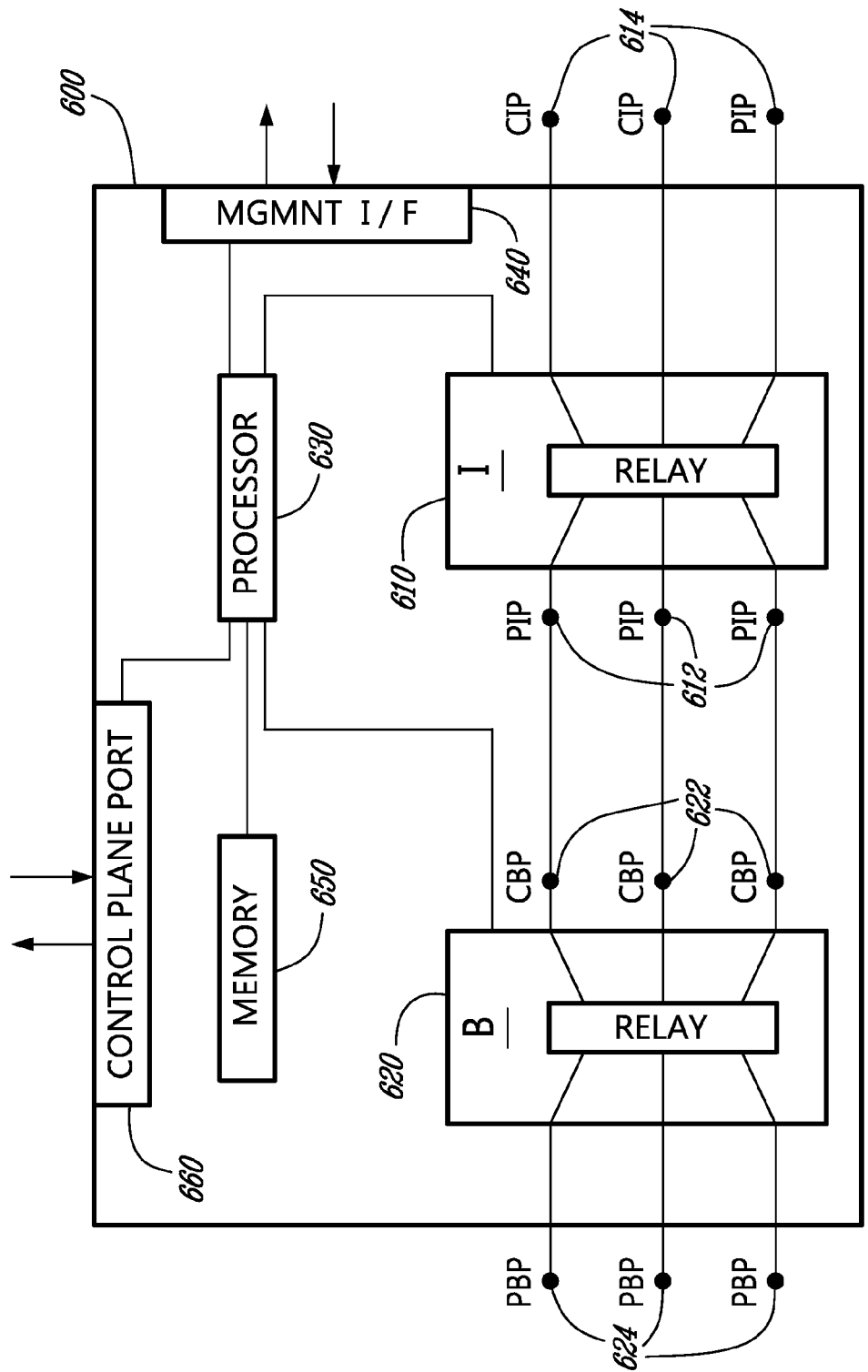
FIG. 6 shows an exemplary edge bridge, according to an aspect the present invention.

An exemplary construction of a bridge will now be described by reference to FIG. 6, which shows an exemplary edge bridge, according to an aspect the present invention.

The edge bridge 600 may for example be an Ethernet bridge. It comprises one or more customer instance components (I component) 610, a backbone component (B component) 620, a processor 630, and may further comprise a management interface 640, a memory 650 and at least one physical port for communicating with other edge bridges, which may be an optional control plane port 660 or a physical port of the B component 620. The I component 610 and the B component 620 both comprise a plurality of data plane ports, which will be described hereinbelow. Data plane ports mainly carry traffic data and may also carry some control signalling, especially if the optional control plane port 660 is not present in the edge bridge 600. Each I component 610 has a plurality of provider instance ports (PIP) 612. Each PIP 612 has a layer two address, or MAC address. The B component 620 has a plurality of customer backbone ports (CBP) 622. Each CBP 622 has a port identity and is connected to one or more of the PIPs 612. The layer two address of the PIP 612 may equivalently be construed as a layer two address of the CBP 622 connected thereto, because addressing a PIP 612 with a given layer two address is equivalent to addressing the CBP 622 to which it is connected. When two or more PIPs 612 are connected to a same CBP 622, those PIPs 612 share a same layer two address. The B component 620 may further have a plurality of provider backbone ports (PBP) 624. PBPs 624 are physical ports of the B component on the data plane. Configuration of the port identities and layer two addresses may be obtained by the processor 630 through a management interface 640 and sent by the processor 640 to the I 610 and B 620 components.

In operation, within the edge bridge 600, the processor 630 requests the at least one physical port, which may be one of the PBPs 624 or the control plane port 660, to advertise, in a message, a first tuple comprising the port identity of one of the CBPs 622 and the layer two address of the PIP 612 connected to that CBP 622.

The edge bridge 600 may further comprise a memory 650. The memory 650 is either a volatile memory, such as a random access memory (RAM), or a non-volatile memory, or persistent memory, that can be electrically erased and reprogrammed and that may be implemented, for example, as a flash memory or as a data storage module. The processor 630 can receive from the control plane port 660 or from one of the PBPs 624 a second tuple from a peer edge bridge and to store it in the memory 650.

The I 610 component may comprise a plurality of customer instance ports (CIP) 614, sometimes called customer network ports (CNP), for connecting the edge bridge 600 towards customer premises. When a customer premise intends to set up a path within the PBB-TE network, leading to the second edge bridge, it sends a request to a CIP 614. The I 610 component informs the processor 630 of the request. The processor 630 computes a label based on the second tuple, the label being for use in establishing a path between the edge bridge and the peer edge bridge. The processor 630 requests one of the PBPs 624 or the control plane port 660 to send the label towards the peer edge bridge.

In some embodiments, many components of the edge bridge 600 are implemented in software. For example, the I 610 and B 620 components may consist of software elements implemented in the processor 630 or in a distinct processor. In such cases, hardware support for at least the CIPs 614 and PBPs 624 and for the optional management interface 640 and control plane port 660, if present, is still required within the edge bridge 600. Also in those cases, the PIPs 612 and CBPs 622 are still logically parts of the I 610 and B 620 components, respectively. Likewise, whether the I 610 and B 620 components are wholly or partly implemented in hardware or software, the PIPs 612 and the CBPs 622 may be implemented as software elements.

In some other embodiments, the I component 610 and the B component 620 may be implemented in distinct physical nodes. In those cases, the PIPs 612 and the CBPs 622 must indeed have hardware realizations in order for the I and B components to communicate. In those cases, the layer two address of a PIP 612 cannot be the same as the layer two address of the CBP 622 connected thereto, so it is actually the layer two address of the PIP 612 that is part of the tuple, along with the port identity of the CBP 622.

Although several aspects of the preferred embodiment of the method, and of the edge bridge of the present invention have been illustrated in the accompanying Drawings and described in the foregoing Detailed Description, it will be understood that the invention is not limited to the embodiment disclosed, but is capable of numerous rearrangements, modifications and substitutions without departing from the teachings of the invention as set forth and defined by the following claims.

The invention claimed is:

1. A method of setting up a path in a provider backbone bridge traffic engineering network, the method comprising the steps of:
   providing a layer two address to a provider instance port of a first edge bridge;
   providing a port identity to a customer backbone port of the first edge bridge; and
   advertising the layer two address and the port identity towards a plurality of switches of the provider backbone bridge traffic engineering network.

2. The method of claim 1, wherein at least one of the plurality of switches is a second edge bridge, the method further comprising the steps of:
   receiving the advertisement at the second edge bridge; and
   storing the layer two address and the port identity in a traffic engineering database of the second edge bridge.

3. The method of claim 2, wherein:
   the layer two address and the port identity are used in the second edge bridge for computing a label when establishing a path.

4. The method of claim 2, further comprising the steps of:
   receiving at the second edge bridge a request for establishing a path towards the first edge bridge;
   computing a label based on the layer two address and the port identity; and
   establishing the path between the second edge bridge and the first edge bridge using the label.

5. The method of claim 4, wherein:
   establishing the path between the second edge bridge and the first edge bridge comprises setting up a tunnel between the customer backbone port of the first edge bridge and a customer backbone port of the second edge bridge.

6. The method of claim 4, wherein:
   the path spans over one or more backbone core bridges.

7. The method of claim 6, further comprising the step of:
   storing the label in a forwarding database of each of the backbone core bridges comprised in the path.

8. The method of claim 1, wherein:
   the advertisement is a type-length-value message in an open shortest path first protocol.

9. The method of claim 1, wherein:
   the layer two address is a virtual address;
   the provider instance port is a virtual port; and
   the customer backbone port is a virtual port.

10. The method of claim 1, wherein:
    one or more of the plurality of switches is a backbone core bridge; and
    at least one of the plurality of switches is a second edge bridge.

11. An edge bridge, comprising:
    a customer instance component having a plurality of provider instance ports, each provider instance port having a layer two address;
    a physical port;
    a backbone component having a plurality of customer backbone ports, each customer backbone port having a port identity and a connection to one of the plurality of provider instance ports;
    a processor adapted to request the physical port to advertise a first tuple comprising the port identity of one of the customer backbone ports and the layer two address of the provider instance port connected to the one of the customer backbone ports.

12. The edge bridge of claim 11, further comprising:
    a memory; and
    wherein the processor is further adapted to receive from the physical port a second tuple from a peer edge bridge and to store in the memory the second tuple.

13. The edge bridge of claim 12, wherein:
    the customer instance component comprises a plurality of customer instance ports for connecting the edge bridge towards customer premises.

14. The edge bridge of claim 13, wherein:
    the customer instance ports are for receiving from one of the customer premises a request to set up a path towards the peer edge bridge;
    the processor is further adapted to compute a label based on the second tuple following receipt of the request to set up a path; and
    the label is for use in establishing the path between the edge bridge and the peer edge bridge.

15. The edge bridge of claim 11, wherein:
    the backbone component further comprises a plurality of provider backbone ports.

16. The edge bridge of claim 15, wherein:
    the physical port is one of the plurality of provider backbone ports.

17. The edge bridge of claim 11, wherein:
    the customer instance component and the backbone component are implemented in software; and
    the provider instance ports and the customer backbone ports are software elements.

18. A method of setting up a path in a provider backbone bridge traffic engineering network, the method comprising the steps of:
    receiving, at a second edge bridge of a plurality of switches of the provider backbone bridge traffic engineering network, a message sent from a first edge bridge to the plurality of switches, the message comprising:
       a layer two address associated to a provider instance port of the first edge bridge; and
       a port identity associated to a customer backbone port of the first edge bridge; and
    storing the layer two address and the port identity in a traffic engineering database of the second edge bridge.

19. The method of claim 18, wherein:
    the layer two address and the port identity are used in the second edge bridge for computing a label when establishing a path.

20. The method of claim 18, wherein:
    one or more of the plurality of switches is a backbone core bridge.

21. The method of claim 18, further comprising the steps of:
    receiving at the second edge bridge a request for establishing a path towards the first edge bridge;
    computing a label based on the layer two address and the port identity; and
    establishing the path between the second edge bridge and the first edge bridge using the label.

22. The method of claim 21, wherein:
    establishing the path between the second edge bridge and the first edge bridge comprises setting up a tunnel between the customer backbone port of the first edge bridge and a customer backbone port of the second edge bridge.

23. The method of claim 21, wherein:
the path spans over one or more backbone core bridges.

24. The method of claim 23, further comprising the step of:
storing the label in a forwarding database of each of the backbone core bridges comprised in the path.

25. The method of claim 18, wherein:
the message is a type-length-value in an open shortest path first protocol.

26. The method of claim 18, wherein:
the layer two address is a virtual address; and
the provider instance port is a virtual port.

27. An edge bridge, comprising:
a memory;
a physical port;
a customer instance component having a plurality of provider instance ports, each provider instance port having a layer two address;
a backbone component having a plurality of customer backbone ports, each customer backbone port having a connection to one of the plurality of provider instance ports and a port identity; and
a processor adapted to:
receive, from the physical port, a first tuple comprising a port identity and a layer two address from a peer edge bridge, and to store in the memory the first tuple; and
request the physical port to advertise a second tuple comprising the port identity of one of the customer backbone ports and the layer two address of the provider instance port connected to the one of the customer backbone ports.

28. The edge bridge of claim 27, wherein:
the customer instance component comprises a plurality of customer instance ports for connecting the edge bridge towards customer premises.

29. The edge bridge of claim 28, wherein:
the customer instance ports are for receiving from one of the customer premises a request to set up a path towards the peer edge bridge;
the processor is further adapted to compute a label based on the first tuple following receipt of the request to set up a path; and
the label is for use in establishing the path between the edge bridge and the peer edge bridge.

30. he edge bridge of claim 27, wherein:
the backbone component further comprises a plurality of provider backbone ports.

31. The edge bridge of claim 30, wherein:
the physical port is one of the plurality of provider backbone ports.

32. The edge bridge of claim 27, wherein:
the customer instance component and the backbone component are implemented in software; and
the provider instance ports and the customer backbone ports are software elements.

* * * * *